(12) United States Patent
Heckel et al.

(10) Patent No.: US 7,455,055 B2
(45) Date of Patent: Nov. 25, 2008

(54) METHOD OF OPERATION OF, AND PROTECTOR FOR, HIGH VOLTAGE POWER SUPPLY FOR ELECTROSTATIC PRECIPITATOR

(75) Inventors: Scott P. Heckel, Stoughton, WI (US); Gregory W. Hoverson, Cookeville, TN (US)

(73) Assignee: Fleetguard, Inc., Nashville, TN (US)

( * ) Notice: Subject to any disclaimer, the term of this patent is extended or adjusted under 35 U.S.C. 154(b) by 867 days.

(21) Appl. No.: 10/959,867

(22) Filed: Oct. 6, 2004

(65) Prior Publication Data

US 2005/0237693 A1 Oct. 27, 2005

Related U.S. Application Data

(63) Continuation-in-part of application No. 10/880,825, filed on Jun. 30, 2004, now Pat. No. 7,082,897, which is a continuation-in-part of application No. 10/820,541, filed on Apr. 8, 2004, now Pat. No. 6,994,076.

(60) Provisional application No. 60/575,709, filed on May 28, 2004.

(51) Int. Cl.
*B03C 3/41* (2006.01)
*F02B 51/00* (2006.01)

(52) U.S. Cl. .................... 123/536; 123/572

(58) Field of Classification Search ......... 123/536–538, 123/572–574; 361/212
See application file for complete search history.

(56) References Cited

U.S. PATENT DOCUMENTS

| 1,605,648 | A | 11/1926 | Cooke |
|---|---|---|---|
| 2,085,349 | A | 6/1937 | Wintermute |
| 3,668,835 | A | 6/1972 | Vicard |
| 3,755,991 | A | 9/1973 | Steuernagel |
| 3,910,779 | A | 10/1975 | Penney |
| 3,999,964 | A | 12/1976 | Carr |
| 4,202,674 | A | 5/1980 | Rodenberger et al. |
| 4,222,748 | A | 9/1980 | Argo et al. |
| 4,239,514 | A | 12/1980 | Junkers |
| 4,381,927 | A | 5/1983 | Noll |
| 4,478,613 | A | 10/1984 | Brettschneider et al. |
| 5,911,213 | A | 6/1999 | Ahlborn et al. |

(Continued)

FOREIGN PATENT DOCUMENTS

DE 307656 10/1919

(Continued)

OTHER PUBLICATIONS

*Mechanical Design considerations for dry precipitators*, Applied Electrostatic Precipitation, F. Knuttsen and K. R. Parker, Dec. 1997, pp. 89-112.

(Continued)

*Primary Examiner*—Hai H Huynh
(74) *Attorney, Agent, or Firm*—Andrus, Sceales, Starke & Sawall, LLP; J. Bruce Schelkopf

(57) ABSTRACT

A protection and operation system and method is provided for a high voltage power supply of an electrostatic precipitator by protecting the power supply from overload when current demand becomes too high, including due to electrode contamination, including during arcing conduction, including plasma conduction.

27 Claims, 12 Drawing Sheets

U.S. PATENT DOCUMENTS

| | | | |
|---|---|---|---|
| 5,934,261 A | 8/1999 | Schumann et al. | |
| 6,221,136 B1 | 4/2001 | Liu et al. | |
| 6,348,103 B1 | 2/2002 | Ahlborn et al. | |
| 6,364,941 B2 | 4/2002 | Liu et al. | |
| 6,527,821 B2 | 3/2003 | Liu et al. | |
| 6,611,440 B1* | 8/2003 | Johnston et al. | 363/44 |
| 6,839,251 B2* | 1/2005 | Johnston et al. | 363/44 |
| 6,902,604 B2* | 6/2005 | Heckel et al. | 96/80 |
| 6,937,455 B2* | 8/2005 | Krichtafovitch et al. | 361/230 |
| 6,994,076 B2* | 2/2006 | Heckel et al. | 123/536 |
| 7,001,447 B1* | 2/2006 | Altman et al. | 95/74 |
| 7,082,897 B2* | 8/2006 | Heckel et al. | 123/3 |
| 7,101,422 B1* | 9/2006 | Altman et al. | 96/30 |
| 7,264,658 B1* | 9/2007 | Heckel et al. | 96/62 |
| 7,267,711 B2* | 9/2007 | Liu | 96/21 |
| 2005/0028676 A1* | 2/2005 | Heckel et al. | 96/95 |

FOREIGN PATENT DOCUMENTS

| | | |
|---|---|---|
| DE | 3702469 | 8/1988 |
| DE | 3930872 | 3/1991 |
| EP | 0044361 | 1/1982 |
| WO | 00/30755 | 6/2000 |

OTHER PUBLICATIONS

Applied Electrostatic Precipitation edited by K. R. Parker, 1997, pp. 1-8.

* cited by examiner

FIG. 11
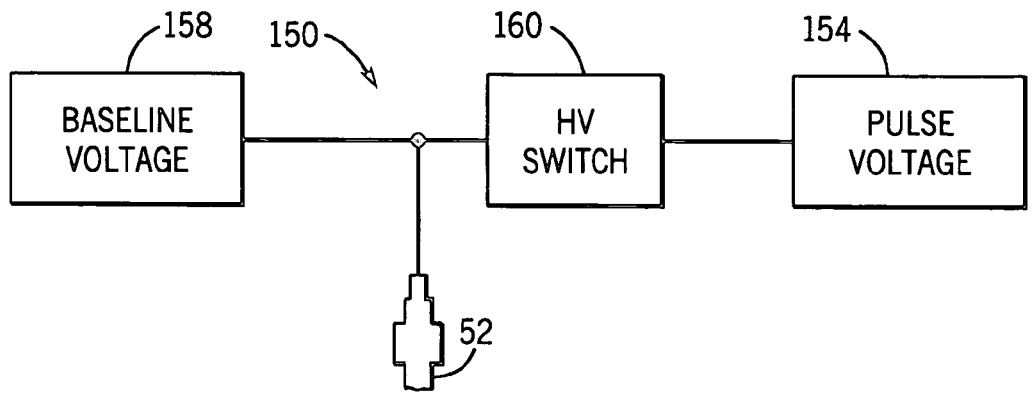
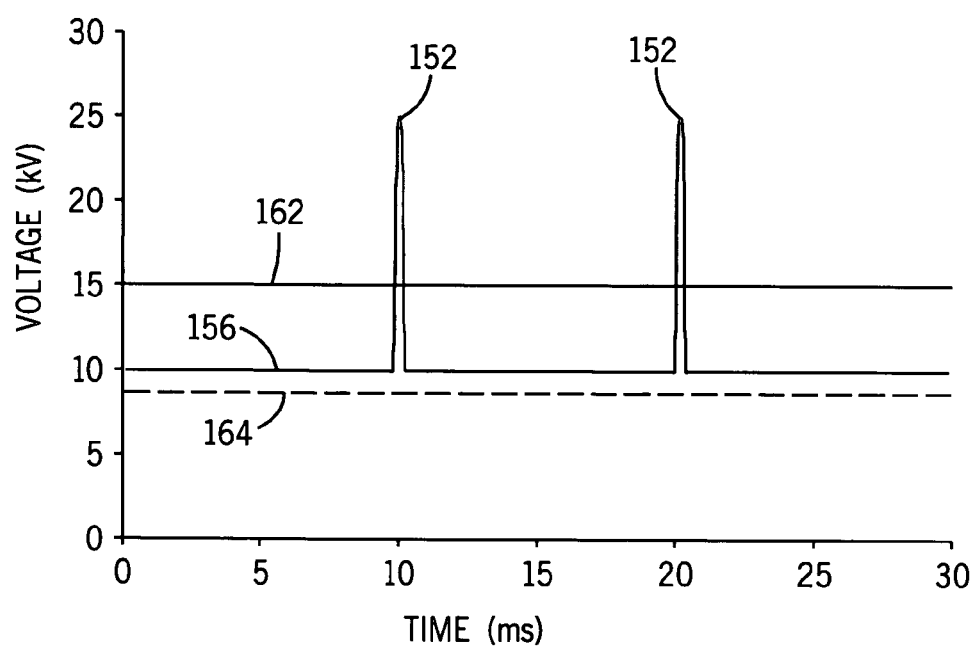
FIG. 12

METHOD OF OPERATION OF, AND PROTECTOR FOR, HIGH VOLTAGE POWER SUPPLY FOR ELECTROSTATIC PRECIPITATOR

CROSS-REFERENCE TO RELATED APPLICATIONS

This application is a continuation-in-part of U.S. patent application Ser. No. 10/880,825, filed Jun. 30, 2004, now U.S. Pat. No. 7,082,897 which is a continuation-in-part of U.S. patent application Ser. No. 10/820,541, filed Apr. 8, 2004, now U.S. Pat. No. 6,994,076 and which claims the benefit of and priority from Provisional U.S. Patent Application No. 60/575,709, filed May 28, 2004, all incorporated herein by reference. This application also claims the benefit of and priority from Provisional U.S. Patent Application No. 60/575,709, filed May 28, 2004.

BACKGROUND AND SUMMARY

The invention relates to a method of operation of, and protector for, a high voltage power supply for an electrostatic precipitator or collector, including for use in internal combustion engine electrostatic crankcase ventilation systems, open or closed, including for diesel engines.

Electrostatic precipitators or collectors, also known as electrostatic droplet collectors, are known in the prior art. In its simplest form, a high voltage corona discharge electrode is placed in proximity to a collector electrode, for example a high voltage corona discharge electrode is placed in the center of a grounded canister or tube forming an annular ground plane providing a collector electrode around the discharge electrode. A high DC voltage, such as several thousand volts, e.g. 15 kilovolts (kV), on the center discharge electrode causes a corona discharge to develop near the electrode due to high electric field intensity. This creates charge carriers that cause ionization of the gas in the gap between the high voltage electrode and the ground collector electrode. As the gas containing suspended particles flows through this region, the particles are electrically charged by the ions. The charged particles are then precipitated electrostatically by the electric field onto the interior surface of the collecting tube or canister.

Electrostatic precipitators have been used in diesel engine crankcase ventilation systems for removing suspended particulate matter including oil droplets from the blowby gas, for example so that the blowby gas can be returned to the atmosphere, or to the fresh air intake side of the diesel engine for further combustion, thus providing a blowby gas recirculation system. Electrostatic precipitators are also used in other internal combustion engine electrostatic crankcase ventilation systems for receiving recirculation gas from the engine, and returning cleaned gas to the engine. Electrostatic precipitators are also used in other applications, e.g. oil mist recirculation in a compressor, and various other applications for collecting particulate ionized in an electric field created by a high voltage corona discharge electrode.

A corona discharge electrode assembly commonly used in the prior art has a holder or bobbin with a 0.006 inch diameter wire strung in a diagonal direction. The bobbin is provided by a central drum extending along an axis and having a pair of annular flanges axially spaced along the drum and extending radially outwardly therefrom. The wire is a continuous member strung back and forth between the annular flanges to provide a plurality of segments supported by and extending between the annular flanges and strung axially and partially spirally diagonally between the flanges.

When an electrostatic precipitator is in service on a diesel engine, a build-up of sludge often occurs on the grounded electrode, i.e. the annular ground plane provided by the canister. This sludge build-up can cause a degradation of the performance of the precipitator, and increases frequency of arcing. The rate of build-up is exacerbated by the arcing, and in turn the arcing increases with the build-up of such material. Eventually, the efficiency of the precipitator decreases due to high frequency (e.g. 400 Hz or greater) arcing and other unstable events which can last for a duration on the order of a minute. In addition to causing a decrease in efficiency, the arcing causes stress on electrical components including the power supply due to the discharge/charge process of arcing. This is problematic in automotive applications which require long service life, or at least extended intervals between servicing, which has limited the application of this technology.

One solution to the noted problem is to periodically clean the collector electrode to remove the build-up therefrom, e.g. by impact or vibration which may be mechanically induced, e.g. mechanical rapping, or by acoustical vibration. This is not satisfactory in the case of crankcase blowby because the particles are liquid, and the build-up is sticky, particularly in the presence of arcing.

Another solution known in the prior art is to clean the electrode by a mechanical wiper automatically during operation. This is undesirable because it requires mechanical parts subject to failure, and increases cost by adding components.

The noted parent '541 application provides a solution wherein the electrostatic precipitator or droplet collector is provided with a replaceable electrode assembly which is connectable and removable in a simple servicing step enabling and facilitating replacement at regular service intervals. In preferred form, part of the precipitator is permanent and remains attached to the engine or an underhood mounting location, and only low cost items are replaced. The ease of servicing promotes periodic replacement, thus avoiding the noted degradation of performance. In further preferred form, the electrode assembly is replaced in a simple spin-on, spin-off step, comparable to replacing an oil filter. This familiarity is considered desirable to encourage maintenance at recommended intervals by service personnel, without having to learn unfamiliar service procedures. In one embodiment, both the collector electrode and the corona discharge electrode are removed as a unit from a mounting head in the system. In another embodiment, only the collector electrode is removed.

The noted '825 application provides a further solution, and enables extended service intervals, improved electrostatic precipitator performance, extended service life of the power supply, and reduced energy usage.

The present invention provides a further solution for extending the service life of the power supply and protecting same.

BRIEF DESCRIPTION OF THE DRAWING

FIG. 1 is a perspective assembly view of an electrostatic precipitator or electrostatic droplet collector (EDC), in accordance with the noted parent '541 application.

FIG. 2 is a sectional view of the structure of FIG. 1.

FIG. 3 is a perspective view of a component of FIG. 2.

FIG. 4 is a perspective view of another component of FIG. 2.

FIG. 5 is a perspective view of another component of FIG. 2.

FIG. 6 is a perspective view of another component of FIG. 2.

FIG. 7 is an enlarged view of a portion of FIG. 2.

FIG. 8 is an exploded perspective view of a portion of FIG. 1.

FIG. 9 is a sectional view of a portion of FIG. 8.

FIG. 10 is a sectional view similar to FIG. 2 and showing another embodiment.

FIGS. 11-12 are taken from the noted parent '825 application.

FIG. 11 illustrates a power supply for an electrostatic precipitator in accordance with the noted parent '825 application.

FIG. 12 is a graph illustrating operation in accordance with the noted parent '825 application.

DETAILED DESCRIPTION

The following description of FIGS. 1-10 is taken from the noted parent '541 application.

Figure 1:
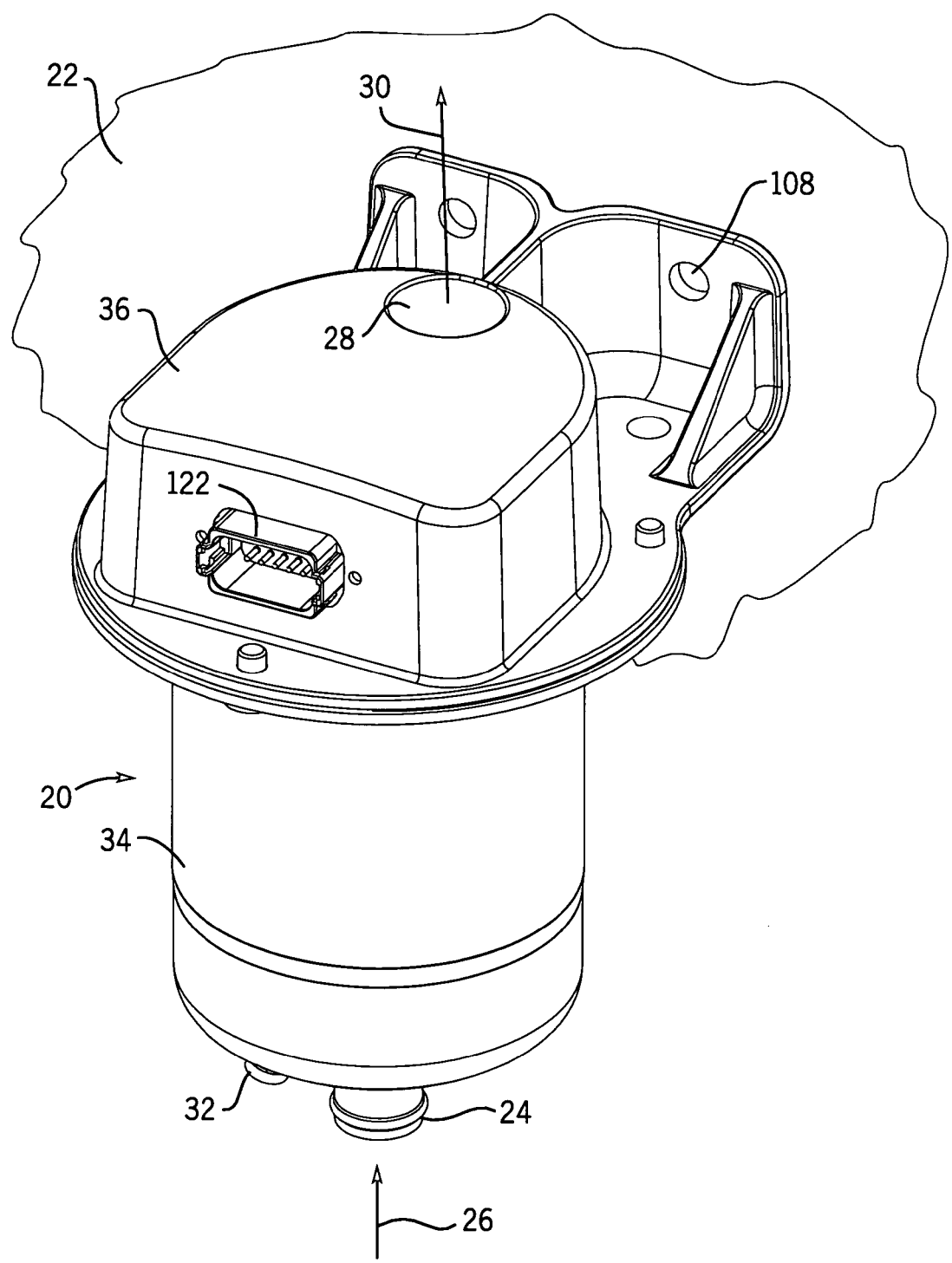
FIGS. 1-10 are taken from the noted parent '541 application.

FIG. 1 shows an electrostatic precipitator or EDC, electrostatic droplet collector, assembly 20 for an internal combustion engine 22 having an electrostatic crankcase ventilation system, e.g. receiving recirculation gas from the engine, such as blowby gas from a diesel engine, at inlet 24 as shown at arrow 26, and returning cleaned gas to the atmosphere or to the engine from outlet 28 as shown at arrow 30. Collected particulate is discharged at valved drain port 32, as is known. The assembly includes a cylindrical canister 34 having the noted inlet 24, and a mounting head 36 having the noted outlet 28. A corona discharge electrode assembly 38, FIG. 2, is in the canister and removable therewith as a unit from the mounting head, to be described.

Figure 2:
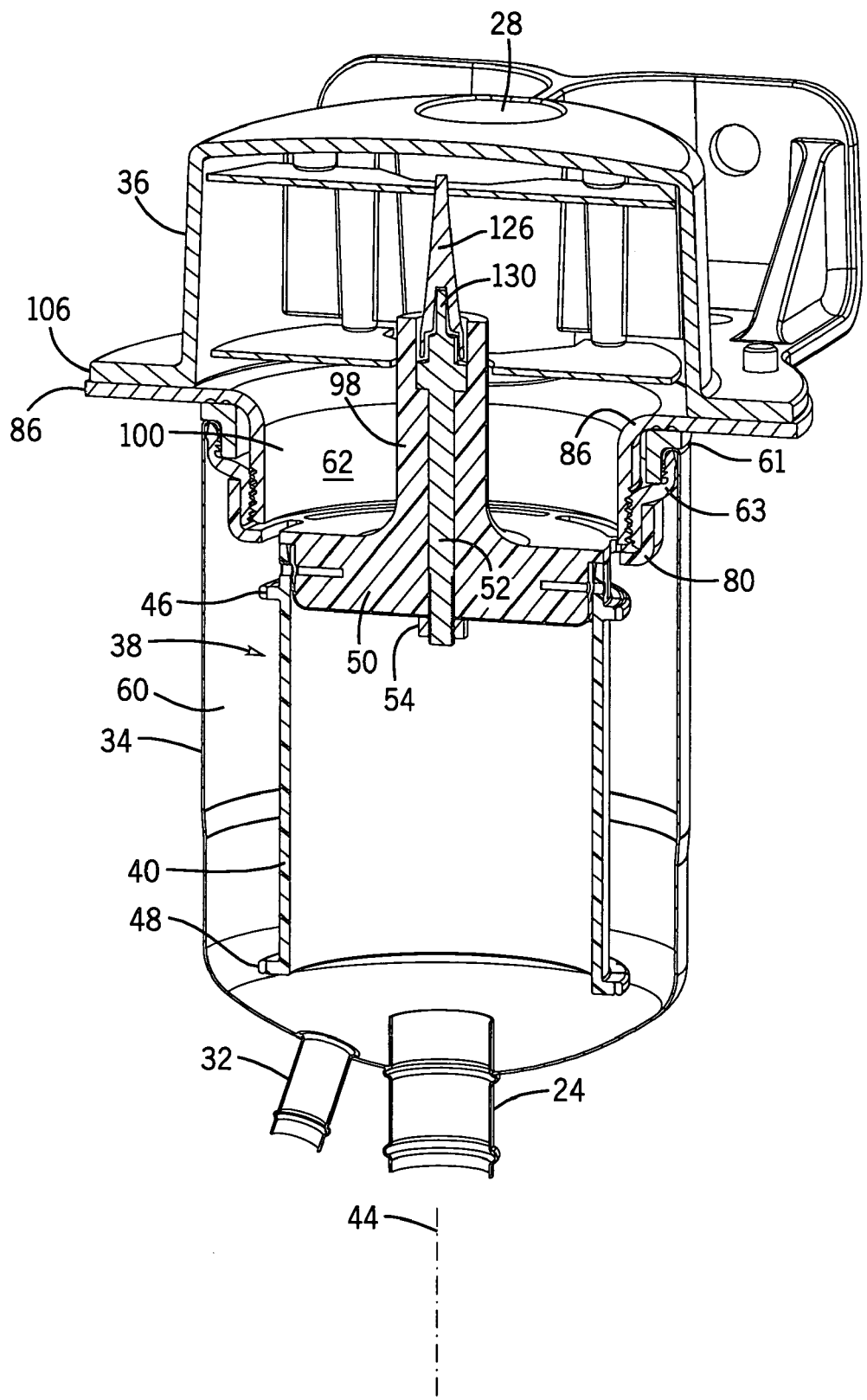
Figure 3:
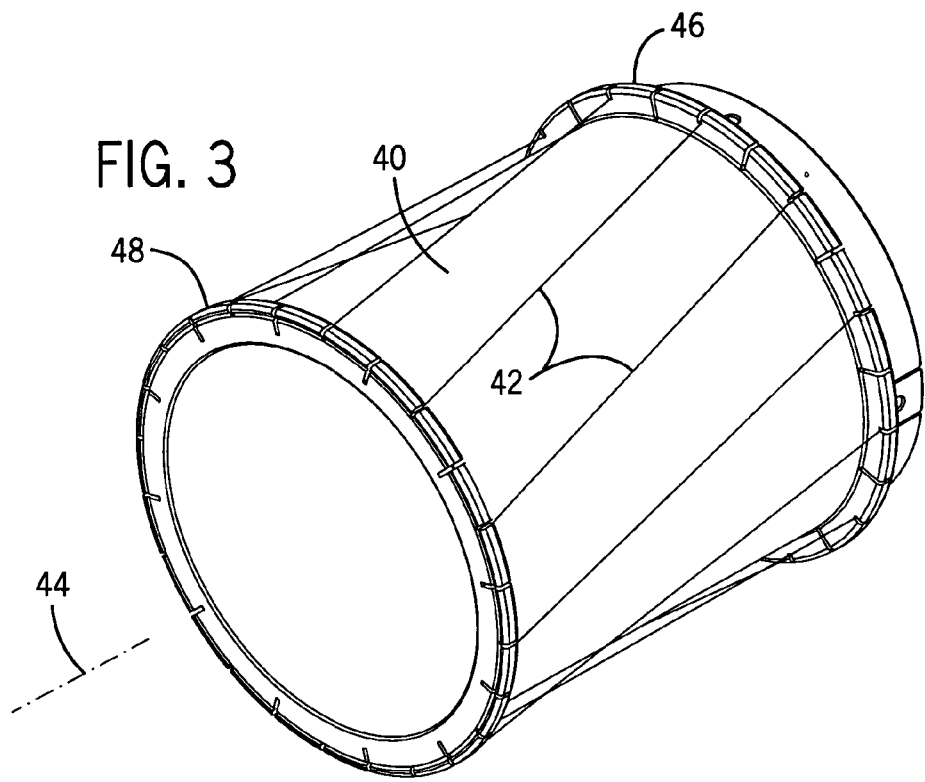
Figure 4:
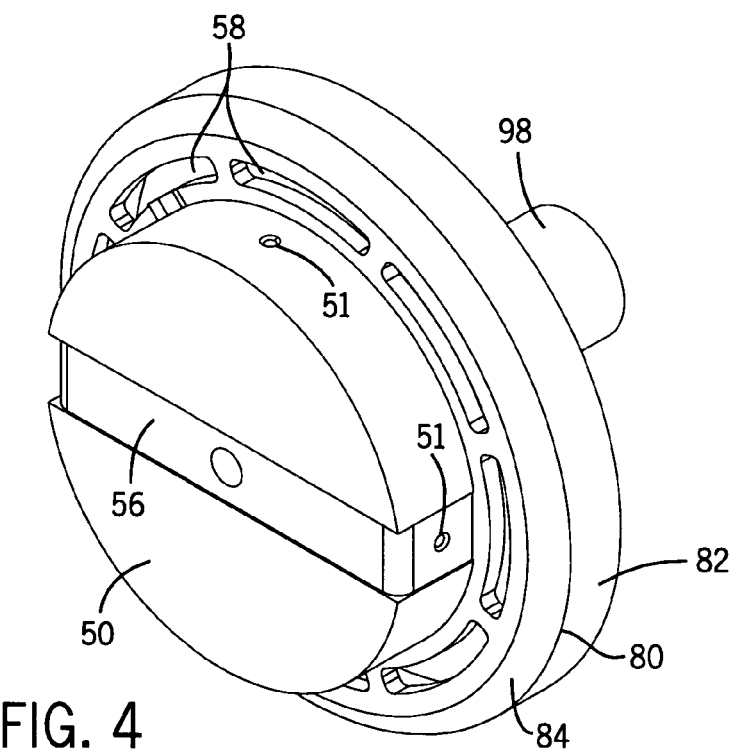

The corona discharge electrode assembly includes an electrically insulating holder or bobbin 40, FIG. 3, as known in the prior art, with a conductor wire 42 strung in a diagonal direction. The bobbin is provided by a central hollow drum extending axially along an axis 44 and having a pair of annular flanges 46, 48 spaced along the drum and extending radially outwardly therefrom. Wire 42 is a continuous member strung back and forth between the annular flanges to provide a plurality of segments supported by and extending between the annular flanges and strung axially and partially spirally diagonally between the annular flanges. In further embodiments, the corona discharge electrode may be provided as shown in commonly owned co-pending U.S. patent application Ser. No. 10/634,565, filed Aug. 5, 2003, or application Ser. No. 10/824,317, filed Apr. 8, 2004. Bobbin 40 is attached to an electrically insulating disk 50, FIGS. 2, 4, e.g. by screw holes such as 51. Insulator disk 50 has a high voltage electrode 52 attached thereto by threaded nut 54 to connect electrode 52 to conductor strip 56 to conduct current to wire 42, as is known. Insulator disk 50 has a plurality of exit apertures 58 around its circumference for conducting recirculation gas therethrough from corona discharge zone 60 into plenum 62. The recirculation gas passes from inlet 24 then through corona discharge zone 60 between high voltage corona discharge electrode 42 and the collector electrode provided by the annular ground plane canister 34 then through apertures 58 into plenum 62 then through mounting head 36 to outlet 28 at arrow 30.

Canister 34 extends axially along axis 44 and has an open axial end 61 facing mounting head 36. A mounting plate 63, FIGS. 2, 5, 7, has a first portion 64 attached to canister 34, e.g. by welding or by crimping the end of the canister over portion 64 as shown at 66. Mounting plate 63 is a nut plate having a second portion 68 removably mountable to the mounting head preferably in threaded relation as shown at threads 70. Electrical insulator 50 is attached to mounting nut plate 63, preferably by being permanently bonded thereto. Mounting nut plate 63 has first segment 64 attached to canister 34, which segment 64 is also sealed to the mounting head by an annular gasket 72 therebetween, such as rubber or other elastomeric material. Second segment 68 of mounting nut plate 63 engages the mounting head in threaded relation at 70. Segment 64 of the mounting nut plate is attached to canister 34 at open axial end 61 of canister, and segment 64 and open axial end 61 are sealed to the mounting head by annular gasket 72 therebetween.

Figure 5:
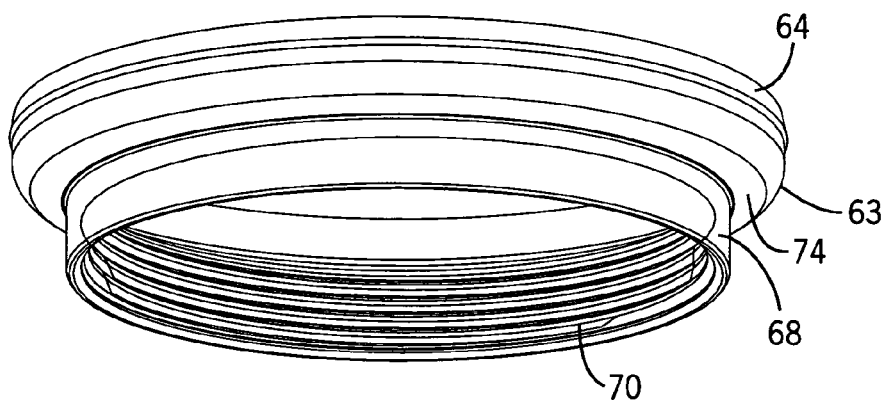
Figure 7:
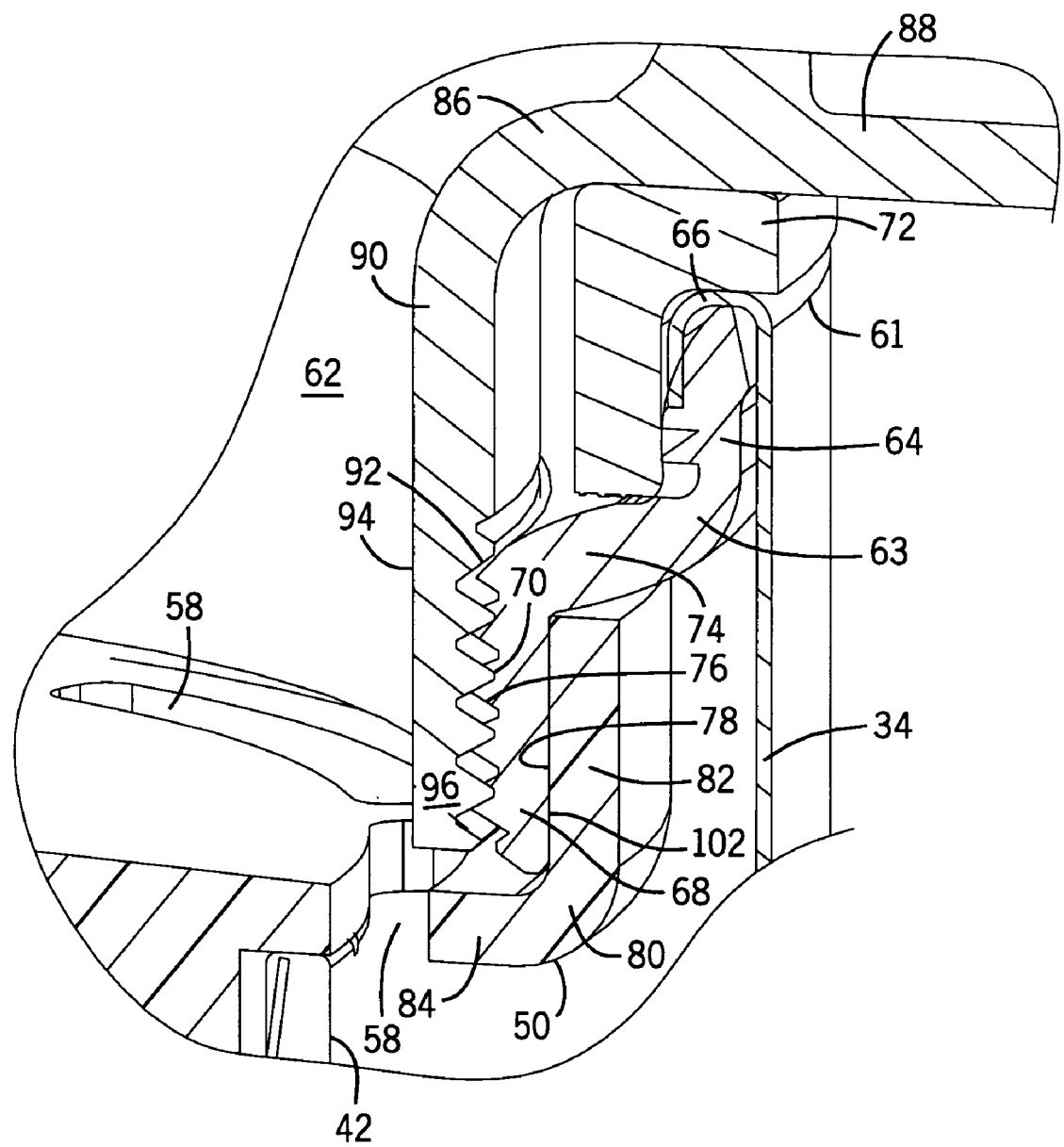
Figure 8:
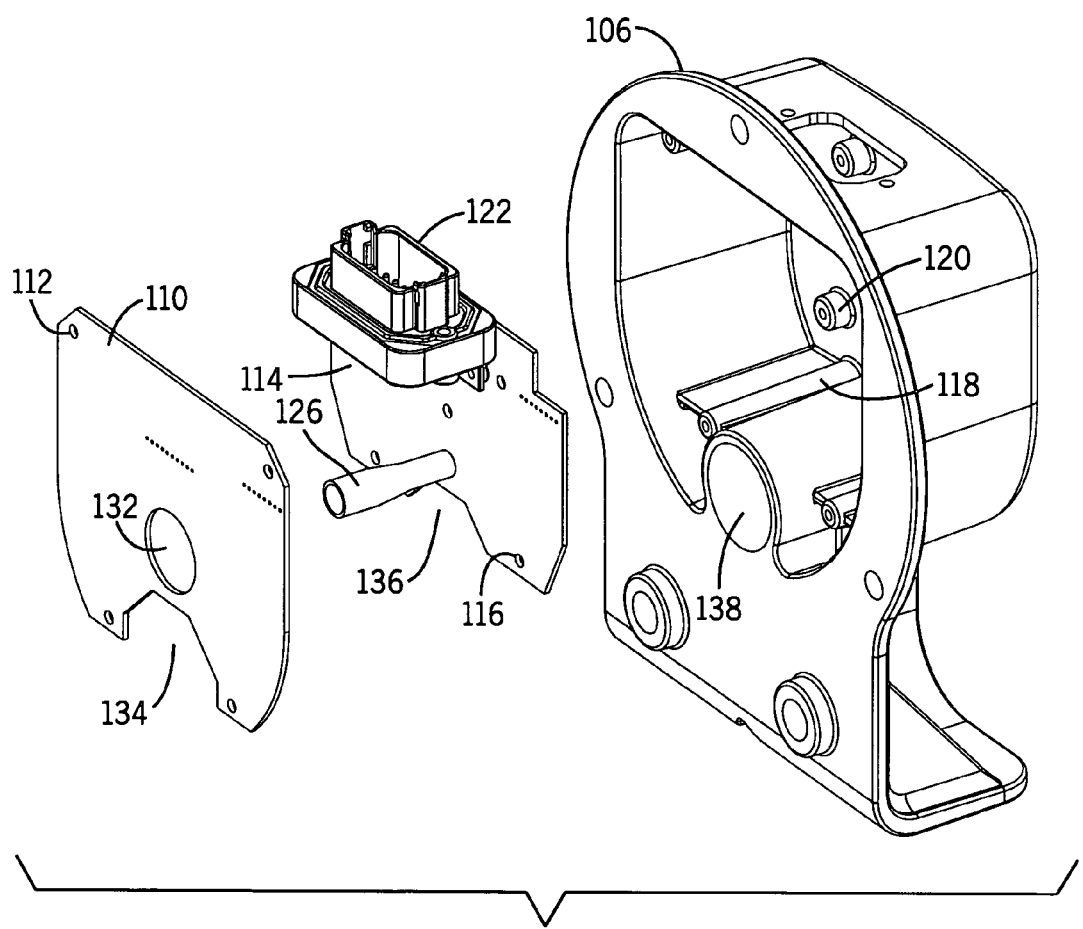
Figure 9:
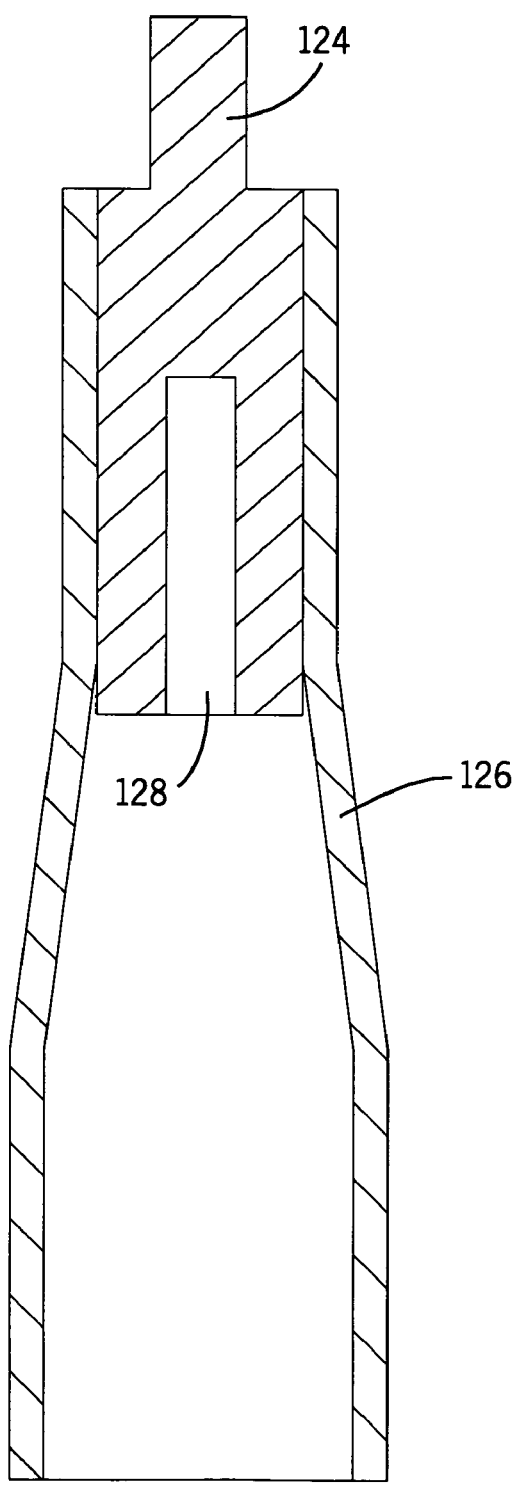

Mounting nut plate 63, FIGS. 2, 5, 7, has an intermediate shoulder 74 extending radially inwardly from first segment 64 to second segment 68. Segment 64 extends axially upwardly from shoulder segment 74 and supports gasket 72. Segment 68 extends axially downwardly from shoulder segment 74. Segment 68 has a first face 76 facing radially inwardly and threaded at 70. Segment 68 has a second face 78 facing radially outwardly. Electric insulator 50 has an outer L-shaped flange 80 having a first leg 82 extending axially upwardly along second face 78 of second segment 68 of mounting nut plate 63. L-shaped flange 80 has a second leg 84 extending radially inwardly from first leg 82 and beneath second segment 68 of mounting nut plate 63. Plenum 62 in the mounting head is radially inward of the threaded engagement at 70 of second segment 68 of mounting nut plate 63 and the mounting head.

Figure 6:
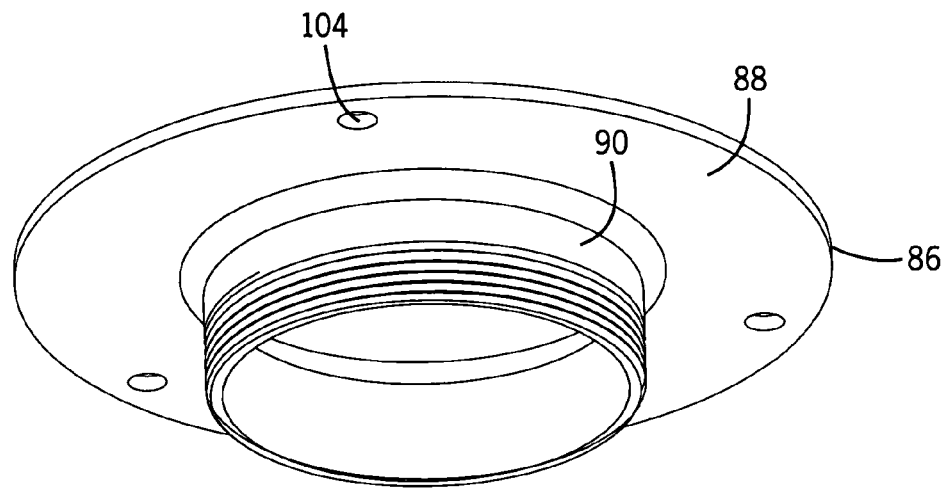

Mounting head 36 includes an inverted L-shaped flange 86, FIGS. 2, 6, 7, having a first leg 88 extending radially outwardly and above first segment 64 of mounting nut plate 63 and open axial end 61 of canister 34 and sealed thereto by gasket 72 in axial compression. Inverted L-shaped flange 86 has a second leg 90 extending axially downwardly and having a first face 92 facing radially outwardly and threadingly engaging at 70 the first face 76 of second segment 68 of mounting nut plate 63. Second leg 90 of inverted L-shaped flange 86 has a second face 94 facing radially inwardly and defining plenum 62. Second leg 90 of inverted L-shaped flange 86 extends axially downwardly to a lower end 96 above second leg 84 of L-shaped flange 80 of electrical insulator 50. Apertures 58 extend axially through second leg 84 of L-shaped flange 80 radially inward of second leg 90 of inverted L-shaped flange 86. Recirculation gas flows from inlet 24 through a first annulus 60 between electrical conductor 42 and canister 34. Electrical insulator 50 is the noted disk having an outer portion with L-shaped flange 80 extending outwardly therefrom, and having a central portion with a columnar stalk 98 extending axially upwardly therefrom into plenum 62 and spaced radially inwardly of second leg 90 of inverted L-shaped flange 86 by a second annulus 100 therebetween defining plenum 62. Second annulus 100 has a smaller outer diameter than first annulus 60. The outer diameter of second annulus 100 is substantially equal to the inner diameter of first annulus 60.

The disclosed construction provides a removable and replaceable EDC assembly. The mounting plate provided by nut plate 63 engages the mounting head in threaded relation at a location 70 radially inward of gasket 72. First and second faces 76 and 78 of the mounting nut plate face radially in opposite directions, and mounting nut plate 63 at such faces is radially between the mounting head at 90 and the electrical insulator 50 at leg 82 on radially distally opposite sides thereof. The electrical insulator has a face 102 facing radially inwardly and engaging face 78 of the mounting nut plate. Face 102 of the electrical insulator is radially outward of face 92 of the mounting head.

Inverted L-shaped flange 86 is mounted at bolt or rivet holes 104, FIG. 6, to an upper cap or housing 106 of the mounting head 36, FIGS. 1, 2, 6, 8. Cap 106 is mounted at bolt holes 108 to the engine or a designated location in the engine compartment. A first wall or divider 110 is mounted to the cap at bolt or screw holes 112 and defines the upper wall of plenum 62. A second wall or divider 114 is mounted to the cap at bolt or screw holes 116 and is spaced above wall 110 by different height stand-offs in the cap, for example longer stand-offs 118 for wall 110, and shorter stand-offs 120 for wall 114. Wall 114 is thus spaced above wall 110 by a space or gap therebetween. Wall 114 is provided by a circuit board having power supply circuitry thereon (not shown) electrically connected externally through plug fitting 122 for supplying electrical current to the power supply circuitry. The power supply circuitry supplies the noted high voltage to a female electrode terminal 124, FIG. 9, mounted to the circuit board and shrouded by electrically insulating boot 126 and having a socket receptacle 128 receiving upper male end 130 of electrode terminal 52 upon mounting of the canister and corona discharge assembly to mounting head 36. Columnar stalk 98 extends upwardly through opening 132 in wall 110. Walls 110 and 114 have respective cut-outs or openings 134 and 136 aligned with tubular opening 138 formed through cap 106 and exiting at outlet 28, to pass recirculation gas from plenum 62 through cut-outs 134, 136 then through tubular passage 138 to outlet 28 for return to the engine.

The system provides a method for easily servicing an internal combustion engine crankcase ventilation system having an EDC, by removing the corona discharge electrode assembly 38 and the canister 34 as a unit from mounting head 36, for replacement by replacing a new corona discharge electrode assembly and canister and mounting same as a unit to mounting head 36. The mounting head, including cap 106 and flange 86 and the components therein, remain attached to the engine or a designated mounted location in the engine compartment. Canister 34 with corona discharge electrode assembly 38 therein is discarded. Canister 34, mounting nut plate 63, insulator 50 and conductor 42 are installed as a unit by detachable mounting of mounting nut plate 63 to the mounting head at threads 70. Canister 34, mounting nut plate 63, insulator 50 and conductor 42 are removed as a unit by detaching mounting nut plate 63 from the mounting head at threads 70. The canister is simply unscrewed from its threaded relation with the mounting head, comparably to removal of an oil filter. This familiarity is considered desirable to encourage maintenance at recommended intervals by service personnel, without having to learn unfamiliar service procedures.

In continuing development, it is anticipated that various alternatives will be considered, including integration of threads, flanges and the like into castings of the components such as the power supply housing or mounting head, various alternate electrical connections for the high voltage terminal such as a pin and socket type of connector providing positive connection and tolerating slight misalignment within set tolerances.

Figure 10:
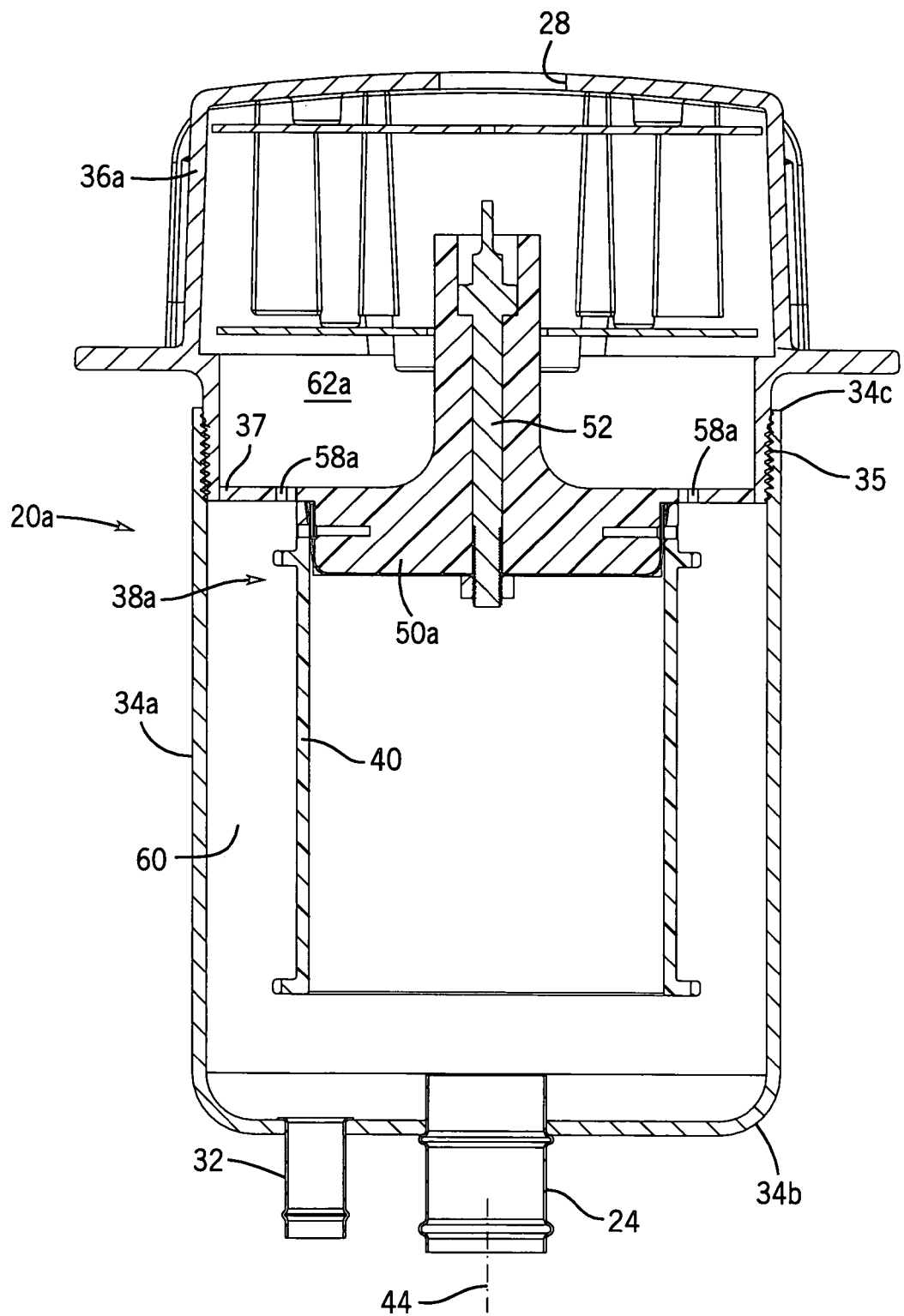

FIG. 10 shows another embodiment and uses like reference numerals from above where appropriate to facilitate understanding. In this embodiment, only the collector electrode provided by the outer canister is removed from the mounting head, while the discharge electrode assembly remains mounted to the mounting head. EDC assembly 20*a* includes a canister 34*a* mounted to mounting head 36*a*. Corona discharge electrode assembly 38*a* in canister 34*a* is spaced from the canister by gap 60 providing a corona discharge zone, with canister 34*a* providing the collector electrode. Canister 34*a* is removably mounted to mounting head 36*a* at threads 35 to permit removal of the collector electrode provided by canister 34*a* and replacement with a new collector electrode provided by a new canister. In FIG. 2, corona discharge electrode assembly 38 is mounted to canister 34, as above described, and removable therewith as a unit from the mounting head. In F*ig*. 10, corona discharge electrode assembly 38*a* is mounted to the mounting head, e.g. by welding or bonding or the like at interface 37, and remains mounted to the mounting head upon removal of canister 34*a* from mounting head 36*a*. Canister 34*a* engages mounting head 36*a* in threaded engagement at threads 35 such that the canister is mounted to the mounting head in spin-on relation, and is removed from the mounting head in spin-off relation. Canister 34*a* extends axially along axis 44 between first and second axial ends 34*b* and 34*c*. End 34*b* is closed and has the noted inlet 24. End 34*c* is open and faces mounting head 36*a* and has the noted threads 35 threaded to the mounting head in threaded engagement. The upper portion of mounting head 36*a* is like mounting head 36 and has the noted outlet 28. Corona discharge electrode assembly 38*a* is like corona discharge electrode assembly 38 along bobbin 40 and has the noted electrical conductor 42 attached to the electrical insulator provided by bobbin 40 and electrically insulating disk 50*a* having one or more apertures 58*a* passing gas axially therethrough from canister 34*a* to mounting head 36*a*. Apertures 58*a* are radially inward of threads 35 and are axially aligned with gap 60 providing the corona discharge zone. Gas flows through apertures 58*a* into plenum 62*a* in the mounting head, which plenum is radially inward of threads 35. Gas flows from inlet 24 through a first annulus at 60 and flows through a second annulus in plenum 62*a*. The first annulus has a larger inner diameter than the second annulus.

The following description of FIGS. 11-12 is taken from the noted parent '825 application.

FIGS. 11 and 12 use like reference numerals from above where appropriate to facilitate understanding. Electrostatic precipitator 20 has the noted collector electrode 34 collecting particulate ionized in an electric field created by high voltage corona discharge electrode assembly 38 pulse energized by a pulsed high voltage power supply 150 supplying voltage to high voltage electrode 52, FIGS. 2, 10, 11, for conduction to conductor wire 42, FIG. 3 or to a corona discharge electrode noted above in further embodiments such as shown in noted U.S. patent application Ser. No. 10/634,565, filed Aug. 5, 2003, or application Ser. No. 10/824,317, filed Apr. 8, 2004. Pulsed high voltage power supply 150 supplies pulsed energization voltage, FIG. 12, to corona discharge electrode 52 which is pulsed between a peak pulse voltage 152, supplied by pulse voltage source 154, and a baseline voltage 156 supplied by baseline voltage source 158. FIG. 12 shows time in milliseconds on the horizontal X-axis, and voltage in kilovolts on the vertical Y-axis. Baseline voltage 156 is selected to be less than the arcing voltage between the corona discharge electrode and the collector electrode which would otherwise cause plasma conduction between the corona discharge electrode and the collector electrode. The duration of peak pulse voltage 152, i.e. pulse width, is selected to be short enough to minimize thermal stress on the power supply and extend the life thereof. Such pulse width is controlled by high voltage switch 160.

In one embodiment, the pulsed energization voltage 156, 152 is supplied to the corona discharge electrode to the exclusion of a constant DC energization voltage as is commonly used in the prior art. In another embodiment, the pulsed energization voltage 156, 152 is superimposed on a DC energization voltage such as 162.

In one embodiment, both the peak pulse voltage 152 and the baseline voltage 156 are above the corona onset voltage 164 between the corona discharge electrode and the collector electrode. Precipitators known in the prior art typically have a rated DC voltage providing sufficient ionization for desired efficiency, which voltage is higher than the corona onset voltage, for example as shown at DC voltage 162 greater than corona onset voltage 164. In the preferred embodiment of the present electrostatic precipitator, baseline voltage 156 is less than the noted rated DC voltage 162 and greater than corona onset voltage 164. Further in the preferred embodiment, the difference between baseline voltage 156 and corona onset voltage 164 is less than the difference between peak pulse voltage 152 and baseline voltage 156. Further in the preferred embodiment, baseline voltage 156 is substantially closer to corona onset voltage 164 than to peak pulse voltage 152. In other embodiments, baseline voltage 156 is less than corona onset voltage 164, and in yet further embodiments, baseline voltage 156 may be zero.

In the preferred electrostatic precipitation method, the corona discharge electrode is pulsed between baseline voltage 156 in the range 0 to 20 kV and a peak pulse voltage 152 in the range 10 to 50 kV of a pulse width in the range 50 ns to 100 ms at a frequency in the range 2 to 100 Hz.

The noted parent provisional '709 application describes a high voltage power supply for use with an electrostatic precipitator or collector applicable to engine crankcase blowby. The power supply incorporates features to protect the power supply's electronic components from running at power levels higher than the unit was designed for. This will extend the service life of the high voltage power supply and help-to control power supply costs.

Figure 13:
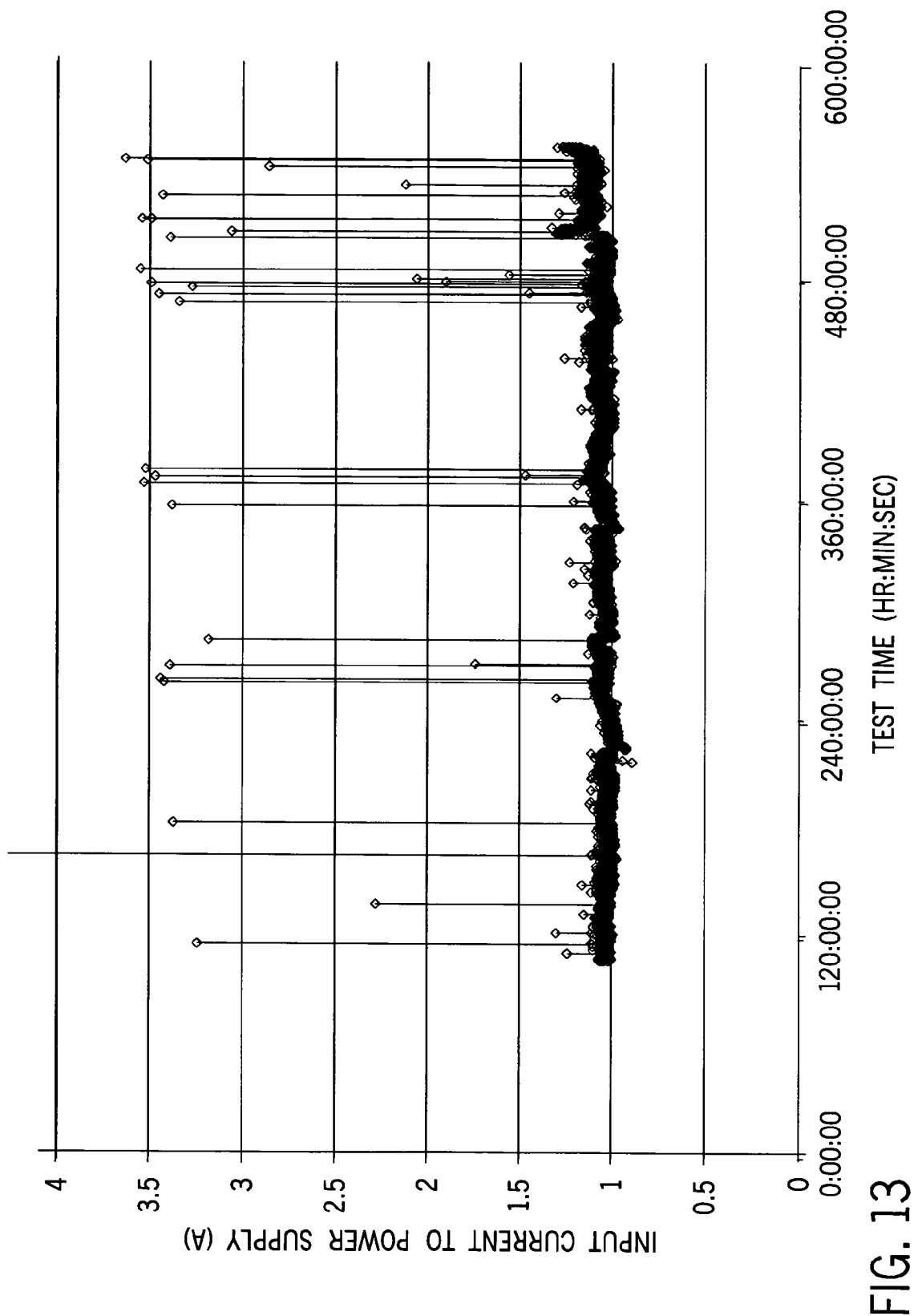
FIG. 13 is a graph illustrating electrostatic precipitator performance, including input current to the high voltage power supply.

An electrostatic droplet collector can be used to reduce the amount of particulate matter emitted from the crankcase blowby of an engine. In typical service, the ground electrode 34 of the collector becomes contaminated with collected matter over the life of the unit. This contamination is the primary cause of electrical arcing inside the unit, as illustrated in FIG. 13 which is a graph showing time in hours:minutes:seconds on the horizontal X-axis and input current to the power supply in amps on the vertical Y-axis. As contamination builds up on shell walls 34, large arcs create surges of input current, i.e. power. These surges overstress the high voltage power supply components, causing premature failures. As lifetime progresses, there are events that occur within the collector that demand a higher current than the power supply was designed for. When these events occur, thermal stresses on the electronic components increase dramatically. Either a long event or the accumulation of many shorter events can eventually cause failure of the power supply.

Figure 14:
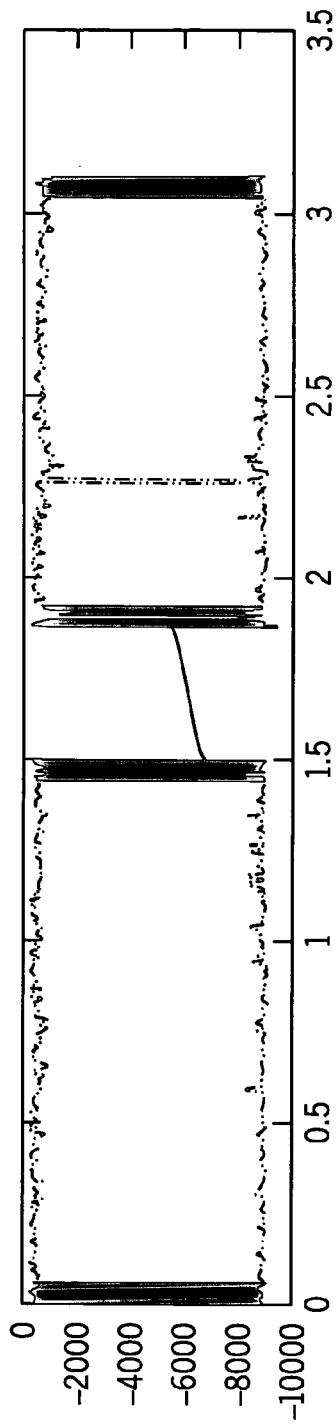
FIG. 14 is a graph illustrating electrostatic precipitator performance, including high voltage output of the high voltage power supply.
Figure 15:
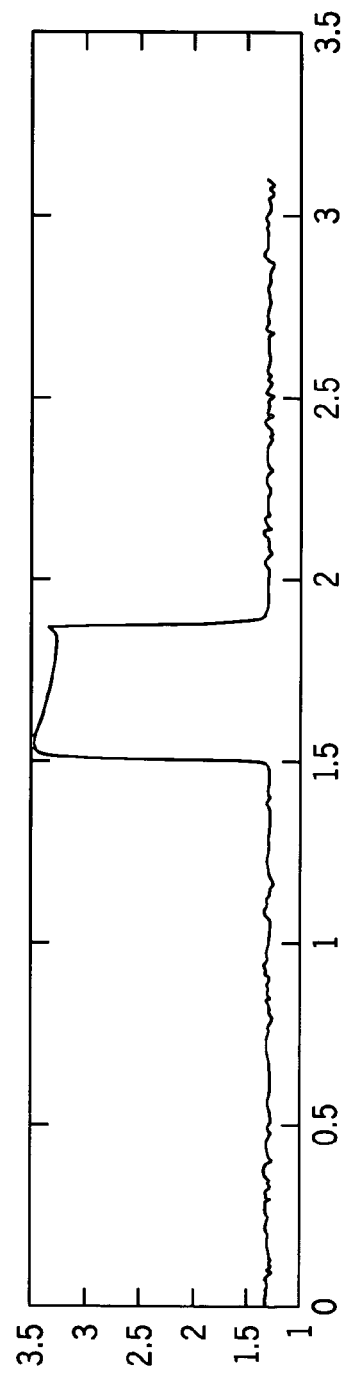
FIG. 15 is a graph illustrating electrostatic precipitator performance, including input current to the high voltage power supply.
Figure 16:
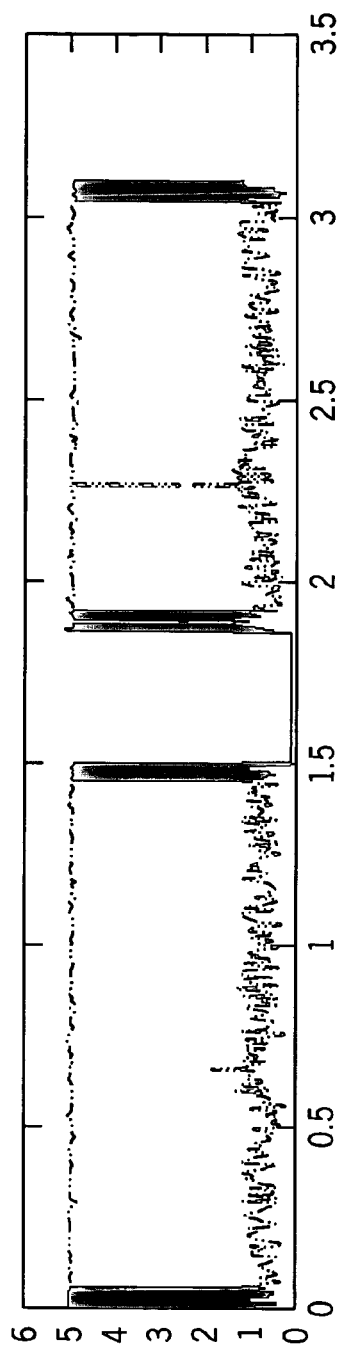
FIG. 16 is a graph illustrating electrostatic precipitator performance, including corona current.

The noted parent provisional '709 application provides a high voltage power supply for an electrostatic precipitator collector and includes circuitry to protect the unit when the demand for current becomes too high. This protects the power supply from overloading of the electronic components beyond their design intent. One such event that can occur is arcing conduction, including plasma conduction. When an arc occurs due to electrode contamination, the electrical field collapses. This affects the temperature of the gas within the local area in and near the arc. The increased temperature lowers the ionization potential of the gas, and this allows the arc to be able to sustain itself at a lower voltage. The affect of this on the system is that a greater amount of power can be conducted through the gas. This in turn causes an increased demand for electrical current input. FIG. 14 shows corona voltage in volts. The voltage fluctuates at a fairly high frequency, for example typically on the order of 250 Hz during normal operation. When a plasma conduction event occurs, the voltage drops to 5 to 7 kV for a period of 4 to 6 seconds. The input current to the power supply, shown in FIG. 15 in amps, rises from its normal value of about 1.3 amps to nearly 3.5 amps during such interval. The corona current, shown in FIG. 16 in amps, drops to zero during such interval.

The present disclosure provides a method of operating a high voltage power supply of an electrostatic precipitator 20 having a collector electrode 34 capturing particulate that is charged by an ionized gas in an electric field created by a high voltage corona discharge electrode 52 energized by a high voltage power supply. The method involves protecting the power supply from overload when current demand becomes too high, including due to electrode contamination, including during arcing conduction when an arc occurs due to electrode contamination, including during plasma conduction, for example when an arc occurs due to electrode contamination which collapses the electric field which increases gas temperature in and near the local area of the arc which lowers ionization potential of the gas which allows the arc to sustain itself at a lower voltage which enables a greater amount of power to be conducted through the gas which increases the demand for electrical current input to the power supply. The system provides a protector protecting the power supply from overload when current demand becomes too high as noted above.

Figure 17:
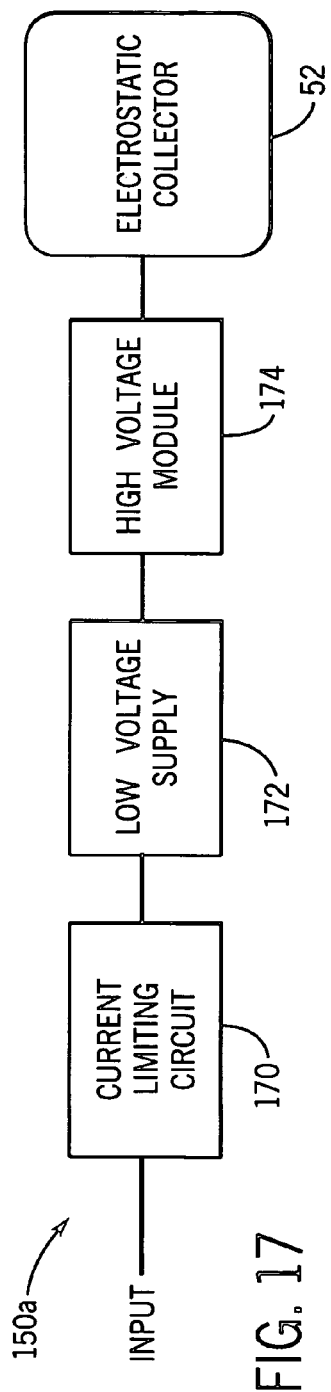
FIG. 17 illustrates a first embodiment of a method of operating and protecting a high voltage power supply of an electrostatic precipitator, and protector therefor.

In a first embodiment, FIG. 17, power supply 150*a* is protected by limiting the electrical current input by a current limiting circuit 170 at the input to the power supply at low voltage supply 172 supplying high voltage module 174 which supplies the high voltage output to the electrostatic collector at electrode 52. Current limiter 170 limits the electrical current input to the power supply notwithstanding the increased demand, including demand due to electrode contamination, including during arcing conduction when an arc occurs, including plasma conduction. Current limiter 170 limits the electrical current input to the power supply notwithstanding the increased demand, FIG. 15, including responsive to electrode contamination, including during arcing conduction when an arc occurs, including responsive to plasma conduction, FIGS. 14, 16, and prevents a sustaining amount of energy from flowing through the gas, to quench the noted arc and prevent the plasma conduction. The current limiter improves the overall performance of the electrostatic precipitator collector by not allowing a sustaining amount of energy to flow through the gas. This will in turn cause the precipitator to return to a normal operating state much sooner, and thus improve overall unit efficiency.

Figure 18:
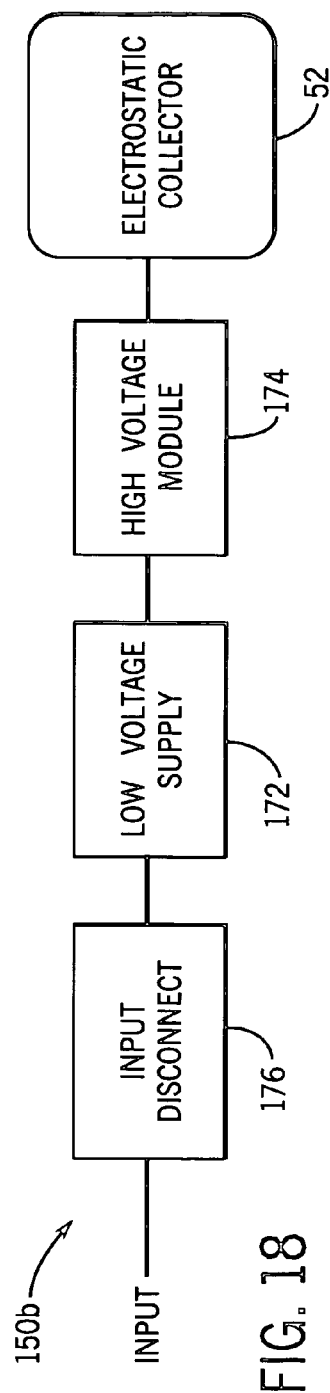
FIG. 18 illustrates a second embodiment of a method of operating and protecting a high voltage power supply of an electrostatic precipitator, and protector therefor.

FIG. 18 shows another embodiment and uses like reference numerals from above where appropriate to facilitate understanding. Power supply 150b is protected by disconnecting at input disconnect 176 the electrical current input to the power supply notwithstanding the increased demand, FIG. 15, including due to electrode contamination, including during arcing conduction when an arc occurs, including responsive to plasma conduction, FIGS. 14, 16. This stops a sustaining amount of energy from flowing through the gas, to quench the arc and prevent the plasma conduction. Input disconnect module 176, such as a rely or electronic disconnect, turns off the power supply momentarily. After the power supply's capacitance is drained, the physical event, i.e. the arc, must stop because there is no energy left to sustain it. The power supply can be turned back on after a predetermined time, which may be adjustable if desired. Alternatively, the corona voltage or current may be monitored to determine when the power supply should be switched back on. The total time required to return the electrostatic precipitator collector back to normal operating conditions will be decreased greatly as compared to an uncontrolled system.

Figure 19:
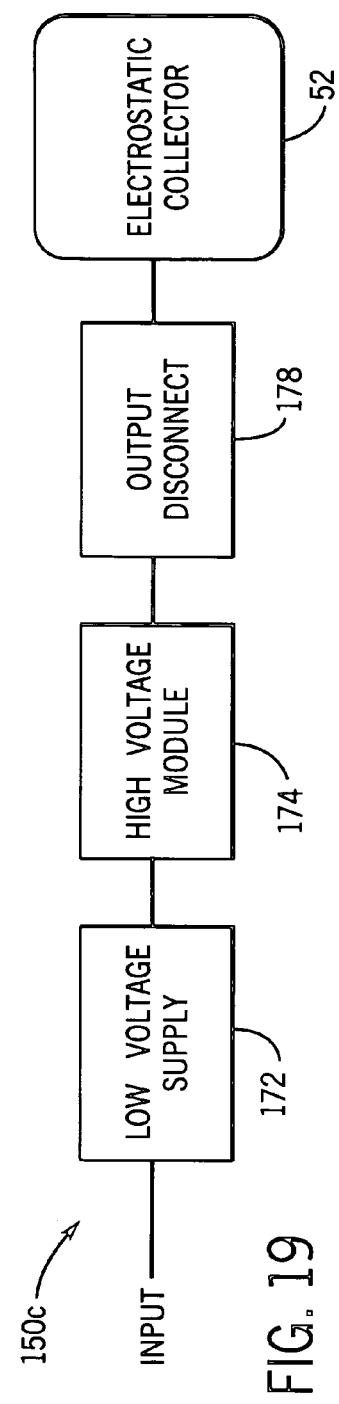
FIG. 19 illustrates a third embodiment of a method of operating and protecting a high voltage power supply of an electrostatic precipitator, and protector therefor.

FIG. 19 shows another embodiment and uses like references from above where appropriate to facilitate understanding. In FIG. 19, power supply 150c is protected by disconnecting at output disconnect module 178 the output of the power supply to the corona discharge electrode 52 notwithstanding increased demand, FIG. 15, including due to electrode contamination, including during arcing conduction when an arc occurs, including responsive to plasma conduction, FIGS. 14, 16. This stops a sustaining amount of energy from flowing through the gas, to quench the arc and prevent the plasma conduction. The high voltage output of the power supply is interrupted by a high voltage rely or other electronic disconnect. This may be done for a predetermined time, or based upon monitoring of the corona voltage or current, FIGS. 14, 16.

The disclosed method of operating and protecting the high voltage power supply, and the protector therefor, limits the amount of power to the high voltage power supply, and reduces or eliminates the ability of the arc to "clamp-on", i.e. sustain itself at a lower voltage than otherwise, and reduces electrical and thermal stresses on the high voltage power supply components. The build-up of collected material on the ground collector electrode at shell 34, FIGS. 1, 2, 10, creates a condition that results in arcing conduction, including plasma conduction. During plasma conduction, input power to the high voltage power supply surges, as above noted, which causes the power supply components to overheat and eventually fail. The present disclosure provides protection of the high voltage power supply from current demands greater than their design limit. The embodiment of FIG. 17 limits input current. The embodiments of FIGS. 18 and 19 turn off the input or output current, respectively. These systems quench arcing conduction, including plasma conduction. The noted contaminant build-up may alternatively occur on the high voltage corona discharge electrode, in which case the present system likewise provides the noted protection.

It is recognized that various equivalents, alternatives, and modifications are possible within the scope of the appended claims.

What is claimed is:

1. A method of operating a high voltage power supply of an electrostatic precipitator having a collector electrode capturing particulate that is charged by an ionized gas in an electric field created by a high voltage corona discharge electrode energized by a high voltage power supply, said method comprising protecting said power supply from overload when current demand becomes too high due to electrode contamination,
said protecting step being selected from the group consisting of:
limiting electrical current input to said power supply notwithstanding said increased demand responsive to said electrode contamination;
disconnecting electrical current input to said power supply notwithstanding said increased demand responsive to said electrode contamination; and
disconnecting the output of said power supply to said corona discharge electrode notwithstanding said increased demand responsive to said electrode contamination.

2. The method according to claim 1 comprising protecting said power supply by limiting electrical current input to said power supply notwithstanding said increased demand responsive to said electrode contamination, and preventing a sustaining amount of energy from flowing through said gas.

3. The method according to claim 1 comprising protecting said power supply by disconnecting electrical current input to said power supply notwithstanding said increased demand responsive to said electrode contamination, and stopping a sustaining amount of energy from flowing through said gas.

4. The method according to claim 1 comprising protecting said power supply by disconnecting the output of said power supply to said corona discharge electrode notwithstanding said increased demand responsive to said electrode contamination, and stopping a sustaining amount of energy from flowing through said gas.

5. The method according to claim 1 comprising protecting said power supply from overload when current demand becomes too high during arcing conduction when an arc occurs due to electrode contamination.

6. The method according to claim 5 comprising protecting said power supply by limiting electrical current input to said power supply notwithstanding said increased demand responsive to said arcing conduction, and preventing a sustaining amount of energy from flowing through said gas, to quench said arc and prevent said arcing conduction.

7. The method according to claim 5 comprising protecting said power supply by disconnecting electrical current input to said power supply notwithstanding said increased demand responsive to said arcing conduction, and stopping a sustaining amount of energy from flowing through said gas, to quench said arc and prevent said arcing conduction.

8. The method according to claim 5 comprising protecting said power supply by disconnecting the output of said power supply to said corona discharge electrode notwithstanding said increased demand responsive to said arcing conduction, and stopping a sustaining amount of energy from flowing through said gas, to quench said arc and prevent said arcing conduction.

9. The method according to claim 5 comprising protecting said power supply from overload when current demand becomes too high during plasma conduction.

10. The method according to claim 9 comprising protecting said power supply by a method selected from the group consisting of:
limiting electrical current input to said power supply notwithstanding said increased demand responsive to said plasma conduction, and preventing a sustaining amount of energy from flowing through said gas, to quench said arc and prevent said plasma conduction;
disconnecting electrical current input to said power supply notwithstanding said increased demand responsive to said plasma conduction, and stopping a sustaining amount of energy from flowing through said gas, to quench said arc and prevent said plasma conduction; and disconnecting the output of said power supply to said corona discharge electrode notwithstanding said increased demand responsive to said plasma conduction, and stopping a sustaining amount of energy from flowing through said gas, to quench said arc and prevent said plasma conduction.

11. The method according to claim 1 comprising protecting said power supply from overload when current demand becomes too high due to contamination of said collector electrode.

12. The method according to claim 1 wherein:
said power supply comprises a low voltage supply upstream of a high voltage module;
said step of limiting electrical current input to said power supply comprises limiting electrical current at said low voltage supply;
said step of disconnecting electrical current input to said power supply comprises disconnecting electrical current at said low voltage supply; and
said step of disconnecting the output of said power supply comprises disconnecting the output of said high voltage module.

13. The method according to claim 12 wherein:
said step of limiting electrical current input to said power supply comprises providing a current limiting circuit upstream of said low voltage supply;
said step of disconnecting electrical current input to said power supply comprises providing an input disconnect module upstream of said low voltage supply; and
said step of disconnecting the output of said power supply comprises providing an output disconnect module downstream of said high voltage module.

14. An electrostatic precipitator having a collector electrode capturing particulate that is charged by an ionized gas in an electric field created by a high voltage corona discharge electrode energized by a high voltage power supply, a protector protecting said power supply from overload when current demand becomes too high,
said protector being selected from the group consisting of:
a current limiter limiting electrical current input to said power supply notwithstanding said increased demand responsive to said electrode contamination;
an input disconnect module disconnecting electrical current input to said power supply notwithstanding said increased demand responsive to said electrode contamination; and
an output disconnect module disconnecting the output of said power supply from said corona discharge electrode notwithstanding said increased demand responsive to said electrode contamination.

15. The electrostatic precipitator according to claim 14 wherein said protector protects said power supply from overload when current demand becomes too high due to electrode contamination.

16. The electrostatic precipitator according to claim 15 wherein said protector comprises a current limiter limiting electrical current input to said power supply notwithstanding said increased demand responsive to said electrode contamination, said current limiter preventing a sustaining amount of energy from flowing through said gas.

17. The electrostatic precipitator according to claim 15 wherein said protector comprises an input disconnect module disconnecting electrical current input to said power supply notwithstanding said increased demand responsive to said electrode contamination, to stop a sustaining amount of energy from flowing through said gas.

18. The electrode precipitator according to claim 15 wherein said protector comprises an output disconnect module disconnecting the output of said power supply from said corona discharge electrode notwithstanding said increased demand responsive to said electrode contamination, to stop a sustaining amount of energy from flowing through said gas.

19. The electrostatic precipitator according to claim 15 wherein said protector protects said power supply during arcing conduction when an arc occurs due to electrode contamination whereupon the electric field collapses, increasing gas temperature in and near the local area of the arc, which increased temperature lowers the ionization potential of the gas, allowing the arc to sustain itself at a lower voltage, in turn enabling a greater amount of power to be conducted through the gas, increasing the demand for electrical current input to said power supply.

20. The electrostatic precipitator according to claim 19 wherein said protector comprises a current limiter limiting said electrical current input to said power supply notwithstanding said increased demand responsive to said arcing conduction, said current limiter preventing a sustaining amount of energy from flowing through said gas, to quench said arc and prevent said arcing conduction.

21. The electrostatic precipitator according to claim 19 wherein said protector comprises an input disconnect module disconnecting said electrical current input to said power supply notwithstanding said increased demand responsive to said arcing conduction, to stop a sustaining amount of energy from flowing through said gas, to quench said arc and prevent said arcing conduction.

22. The electrostatic precipitator according to claim 19 wherein said protector comprises an output disconnect module disconnecting the output of said power supply from said corona discharge electrode notwithstanding said increased demand responsive to said arcing conduction, to stop a sustaining amount of energy from flowing through said gas, to quench said arc and prevent said arcing conduction.

23. The electrostatic precipitator according to claim 19 wherein said protector protects said power supply during plasma conduction.

24. The electrostatic precipitator according to claim 23 wherein said protector protects said power supply during plasma conduction when an arc occurs due to electrode contamination whereupon the electrical field collapses, increasing gas temperature in and near the local area of the arc, which increased temperature lowers the ionization potential of the gas, allowing the arc to sustain itself at a lower voltage, in turn enabling a greater amount of power to be conducted through the gas, increasing the demand for electrical current input to said power supply, and wherein said protector is selected from the group consisting of:
a current limiter limiting electrical current input to said power supply notwithstanding said increased demand responsive to said plasma conduction, said current limiter preventing a sustaining amount of energy from flowing through said gas, to quench said arc and prevent said plasma conduction;
an input disconnect module disconnecting electrical current input to said power supply notwithstanding said increased demand responsive to said plasma conduction, to stop a sustaining amount of energy from flowing through said gas, to quench said arc and prevent said plasma conduction; and
an output disconnect module disconnecting the output of said power supply from said corona discharge electrode notwithstanding said increased demand responsive to said plasma conduction, to stop a sustaining amount of energy from flowing through said gas, to quench said arc and prevent said plasma conduction.

25. The electrostatic precipitator according to claim 15 wherein said protector protects said power supply from overload when current demand becomes too high due to contamination of said collector electrode.

26. The electrostatic precipitator according to claim 15 wherein:
said power supply comprises a low voltage supply upstream of a high voltage module;
said current limiter is at said low voltage supply;
said input disconnect module is at said low voltage supply; and
said output disconnect module is at said high voltage module.

27. The electrostatic precipitator according to claim 26 wherein:
said current limiter comprises a current limiting circuit upstream of said low voltage supply;
said input disconnect module is upstream of said low voltage supply; and
said output disconnect module is downstream of said high voltage module.

* * * * *